US005263189A

United States Patent [19]

Kultgen et al.

[11] Patent Number: 5,263,189

[45] Date of Patent: Nov. 16, 1993

[54] APPARATUS AND METHOD FOR CORRECTING ELECTRICAL PATH LENGTH PHASE ERRORS

[75] Inventors: Michael A. Kultgen, Lenexa; Stefan R. Komarek, Overland Park; Glen M. Whiting, Olathe, all of Kans.

[73] Assignee: AlliedSignal Inc., Morris Township, Morris County, N.J.

[21] Appl. No.: 798,449

[22] Filed: Nov. 26, 1991

[51] Int. Cl.[5] ............ H04B 7/01

[52] U.S. Cl. ............ 455/276.1; 455/139; 342/174

[58] Field of Search ............ 455/272, 273, 276.1, 455/277.1, 137, 138, 139; 342/372, 375, 368, 374, 174

[56] References Cited

U.S. PATENT DOCUMENTS

| | | | |
|---|---|---|---|
| 3,242,430 | 3/1966 | Ghose | 455/276.1 |
| 4,065,771 | 12/1977 | Gulick et al. | 342/368 |
| 4,074,266 | 2/1978 | Yokoi et al. | 342/368 |
| 5,008,844 | 4/1991 | Kyriakos et al. | 342/174 |
| 5,038,146 | 8/1991 | Troychak et al. | 342/372 |

*Primary Examiner*—Reinhard J. Eisenzopf
*Assistant Examiner*—Nguyen Vo
*Attorney, Agent, or Firm*—Donald B. Paschburg; Howard G. Massung

[57] ABSTRACT

Compensation is provided for phase errors resulting from differing path lengths in a receiver system having a multi-element antenna. Variable phase shifters are adjusted to provide phase shifts to the electrical paths so that the effective lengths of the electrical paths are approximately equal.

7 Claims, 4 Drawing Sheets

APPARATUS AND METHOD FOR CORRECTING ELECTRICAL PATH LENGTH PHASE ERRORS

BACKGROUND OF THE INVENTION

1. Field of the Invention:

The present invention relates to compensating phase errors in electromagnetic receiving systems, more specifically it relates to compensating for errors that result from differing electrical path lengths in electromagnetic receiving systems having a multi-element antenna.

2. Description of the Related Art:

In receiving systems that are used to measure a bearing angle of an intruder, it is important to maintain an accurate phase relationship between the signals from the different elements of the antenna.

Phase errors are introduced into these systems by differences in electrical path lengths between the antenna elements and other parts of the receiver system.

In the past, this problem was addressed by calibrating the antenna system after it has been installed on an aircraft; this approach added to the expense and complexity of the installation process. The problem was also addressed by connecting the antenna elements to the receiver using cables or conductors that have a precisely controlled length. Using precision length cables or conductors proved to be expensive and inconvenient. In addition to being expensive, the precision length cables or conductors required using specialized test equipment to verify cable length.

SUMMARY OF THE INVENTION

The present invention comprises an apparatus and method for correcting phase errors in an electromagnetic receiving system that comprises an antenna having a first element being connected to a first electrical path, a second element being connected to a second electrical path, a third element being connected to a third electrical path and a fourth element being connected to a electrical path conductor. The four antenna elements are arranged in an approximate square pattern. A selective transmitting means transmits a test signal on a selected element so that the test signal is received by another element, the selected element being one of the second, third and fourth elements. A first phase shifter provides a variable phase shift to a signal carried on the second electrical path and produces a first phase shifted signal. A second phase shifter provides a second variable phase shift to a signal carried on the third electrical path and produces a second phase shifted signal. A third phase shifting means provides a third variable phase shift to a signal carried on the fourth electrical path and produces a third phase shifted signal. A signal combining means combines a signal carried on the first electrical path with the first, second and third phase shifted signals so that an electrical path length phase correction value can be determined.

The present invention compensates for differences in electrical path lengths in receiving systems having a multi-element antenna. These differences result from differing cable or conductor lengths. The invention compensates for these differing lengths after initial installation and during normal operation. By automatically compensating for differing conductor length the present invention simplifies the installation process by eliminating the need for precision length cables or specialized test equipment that is used to verify cable length. By periodically compensating for differing cable lengths during normal operation, the present invention removes phase errors that result from temperature variations and equipment aging. This results in reduced service costs and a more reliable receiver system.

DESCRIPTION OF THE PREFERRED EMBODIMENTS

The following conventions are used in describing the present invention. Phasers are represented by a letter followed by a # superscript. The electrical length between any two elements in antenna 10 is indicated by the antenna element letters of interest underlined. The electrical distance between elments A and B is indicated by AB, the electrical distance between elements B and C is indicated by BC, the electrical distance between elements C and D is indicated by CD, the electrical distance between elements A and D is indicated by AD, the electrical distance between elements AC is indicated by AC and the electrical distance between elements B and D is indicated by BD.

Figure 1:
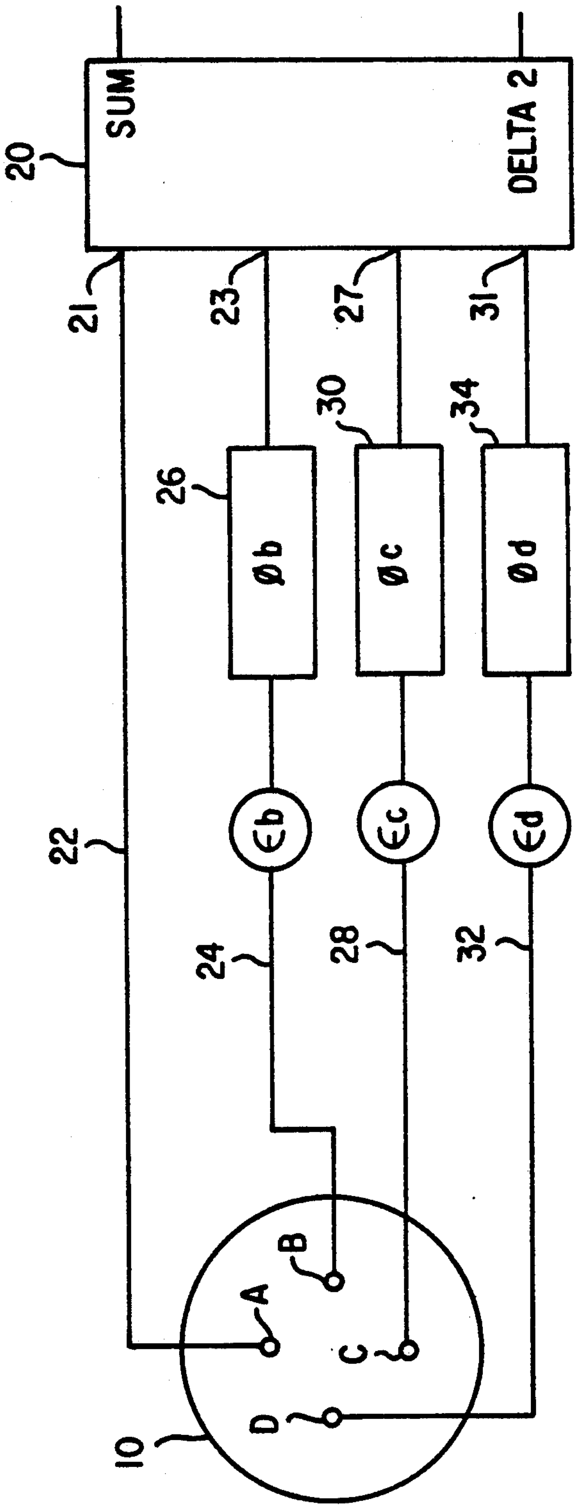
FIG. 1 is a block diagram illustrating a four element antenna and the phase errors introduced by differing electrical path lengths.

FIG. 1 illustrates multi-element antenna 10 having elements A, B, C and D. The signals received from each of the elements are fed to signal combiner circuit 20. The signal from element A passes directly to input 21 of signal combiner 20 via electrical path or conductor 22. The signal from element B passes to input 23 of signal combiner 20 over electrical path or conductor 24 which includes phase shifter 26. The signal from element C passes to input 27 of signal combiner 20 over electrical path or conductor 28 which includes phase shifter 30. The signal from element D passes to input 31 of signal combiner 20 over electrical path or conductor 32 which includes phase shifter 34. The circles containing $\epsilon b$, $\epsilon c$ and $\epsilon d$ represent the phase error introduced by the differing electrical path lengths. The differences in electrical path lengths are taken with respect to the length of electrical path 22. Phase errors represented by $\epsilon b$, $\epsilon c$ and $\epsilon d$ are compensated for by monitoring the DELTA2 output of signal combiner 20 and by adjusting phase shifters 26, 30 and 34. Phase error $\epsilon b$ is compensated for by introducing phase bias $\phi b = -\epsilon b$ using phase shifter 26, phase error $\epsilon c$ is compensated for by introducing phase bias $\phi c = -\epsilon c$ using phase shifter 30 and phase error $\epsilon d$ is compensated for by introducing phase bias $\phi d = -\epsilon d$ using phase shifter 34.

Signal combiner 20 receives signal $A^{\#}$ from electrical path 22 on input 21, signal $B^{\#}$ from electrical path 24 on input 23, signal $C^{\#}$ from electrical path 28 on input 27 and signal $D^{\#}$ from electrical path 32 on input 31. The DELTA2 output is represented by the following equation, which is phaser notation, $$\mathrm{DELTA2} = (A^{\#} - C^{\#}) + j(B^{\#} - D^{\#}) + \theta$$

where "j" can be interpreted to represent a phase shift of 90° and $\theta$ is an arbitrary phase offset which can be ignored with respect to correcting electrical path length phase errors.

The phase errors are compensated for by making the assumptions that AB is approximately equal to BC, that AB is approximately equal to CD, that AD is approximately equal to BC and that AC is approximately equal to BD. Electrical distances are considered approximately equal if they are within plus or minus 45 electrical degrees of each other.

The phase bias $\phi c$, which used to compensate for phase error $\epsilon c$, is obtained by transmitting a signal on element B and receiving the signal on elements A and C while terminating element D. The phase shift bias $\phi c$ of phase shifter 30 is adjusted until the voltage at output DELTA2 of signal combiner 20 is at a minimum. When the signal at output DELTA2 of signal combiner 20 is minimized, the present phase bias $\phi c$ compensates for phase error $\epsilon c$. The following equations illustrate how phase bias $\phi c$ is obtained.

$$DELTA2 = (A^{\#} - C^{\#}) + j(B^{\#} - D^{\#})$$
$$0 = (A^{\#} - C^{\#})$$
$$A^{\#} = C^{\#}$$

When written in terms of electrical path lengths, the above equation can be rewritten as follows:

$$\underline{AB} = \underline{BC} + \epsilon c + \phi c$$
$$\phi c = -\epsilon c$$

The phase bias $\phi d$, which is used to compensate for phase error $\epsilon d$, is obtained using a two-step process. The first step in the process involves transmitting a signal on element B while receiving a signal on elements A and D with element C being terminated. The phase bias $\phi d1$, which is introduced by phase shifter 34, is adjusted until output DELTA2 of signal combiner 20 is minimized. The following equations illustrate the relationship between phase bias $\phi d1$ and phase error $\epsilon d$.

$$DELTA2 = (A^{\#} - C^{\#}) + j(B^{\#} - D^{\#})$$
$$0 = A^{\#} - jD^{\#}$$
$$A^{\#} = D^{\#} + 90^\circ$$

When written in terms of electrical path lengths, the above equation can be rewritten as follows.

$$\underline{AB} = \underline{BD} + \phi d1 + \epsilon d + 90^\circ$$
$$\phi d1 = \underline{AB} - \underline{BD} - \epsilon d - 90^\circ$$

The second step in obtaining the proper phase bias to compensate for phase error $\epsilon d$ involves transmitting a signal on element C while receiving the signal on elements A and D with element B being terminated. The phase bias $\phi d2$ of phase shifter 34 is then adjusted until the voltage at output DELTA2 of signal combiner 20 is minimized. The following equations illustrate the relationship between phase bias $\phi d2$ and phase error $\epsilon d$.

$$DELTA2 = (A^{\#} - C^{\#}) + j(B^{\#} - D^{\#})$$
$$0 = A^{\#} - jD^{\#}$$
$$A^{\#} = jD^{\#}$$
$$A^{\#} = D^{\#} + 90^\circ$$

When written in terms of electrical path lengths, the above equation can be rewritten as follows.

$$\underline{AC} = \underline{CD} + \phi d2 + \epsilon d + 90^\circ$$
$$\phi d2 = \underline{AC} - \underline{CD} - \epsilon d - 90^\circ$$

The desired phase shifter bias $\phi d$ is found by averaging the biases $\phi d1$ and $\phi d2$ and then adding 90° to the result. When calculating the average of angles, care must be taken to ensure the proper results. For example, the average of 80 degrees and 274 degrees is either 177 degrees or 69 degrees, depending on your perspective (274 is equivalent to −86). In performing this calculation it should be assumed that $\phi d1$ is greater than $\phi d2$ if the quantity AB−BD is larger than AC−CD, and if AB−BD is less than AC−CD, it should be assumed that $\phi d2$ is greater than $\phi d1$. The following equations illustrate the relationship between phase shifter bias $\phi d1$ and $\phi d2$.

$$0.5(\phi d1 + \phi d2) = 0.5(\underline{AC} - \underline{BD} + \underline{AB} - \underline{CD} - 2\epsilon d - 180^\circ)$$
$$0.5(\phi d1 + \phi d2) = -\epsilon d - 90^\circ$$

Therefore, $$\phi d = 0,5(\phi d1 + \phi d2) + 90^\circ = -\epsilon d$$

In a similar manner, a phase shift bias $\phi b$, which compensates for phase error $\epsilon b$, is found by transmitting on element C while receiving on elements A and B with element D being terminated. The phase shifter bias $\phi b1$ is then adjusted until output DELTA2 of signal combiner 20 is minimized. The relationship between $\phi b1$ and phase error $\epsilon b$ is illustrated by the following equations.

$$DELTA2 = (A^{\#} - C^{\#}) + j(B^{\#} - D^{\#})$$
$$0 = A^{\#} + jB^{\#}$$
$$A^{\#} = -jB^{\#}$$
$$A^{\#} = B^{\#} - 90^\circ$$

When written in terms of electrical path length, the above equation can be rewritten as follows.

$$\underline{AC} = \underline{BC} + \phi b1 + \epsilon b - 90^\circ$$
$$\phi b1 = \underline{AC} - \underline{BC} - \epsilon b + 90^\circ$$

The second step in determining phase shifter bias $\phi b$ involves transmitting on element D while receiving on elements A and B with element C being terminated. Phase shifter bias $\phi b2$ is obtained by adjusting phase shifter 26 until output DELTA2 of signal combiner 20 is minimized. The following equations illustrates the relationship between phase bias $\phi b2$ and phase error $\epsilon b$.

$$DELTA2 = (A^{\#} - C^{\#}) + j(B^{\#} - D^{\#})$$
$$0 = A^{\#} + jB^{\#}$$
$$A^{\#} = -jB^{\#}$$
$$A^{\#} = B^{\#} - 90^\circ$$

When written in terms of electrical path lengths, the above equation can be rewritten as follows.

$$\underline{AD} = \underline{BD} + \phi b2 + \epsilon b - 90^\circ$$
$$\phi b2 = \underline{AD} - \underline{BD} - \epsilon b + 90^\circ$$

Phase shifter bias $\phi b$ is obtained by averaging biases $\phi b1$ and $\phi b2$ and then subtracting 90°. In performing this calculation it should be assumed that phase bias $\phi b1$ is less than phase bias $\phi b2$ if the quantity AD−BD is greater than AC−BC, and if AD−BD is less than AC−BC, it should be assumed that $\phi b2$ is less than $\phi b1$. The following equation illustrates the relationship between phase shifter bias $\phi b$ and biases $\phi b1$ and $\phi b2$.

$$\phi b = 0.5(\phi b1 + \phi b2) - 90° = -\epsilon b$$

In the above equations it was assumed that DELTA2 goes to zero, however, DELTA2 typically goes to a minimum value which is not equal to zero. This occurs because the amplitudes of the phaser terms in the equations are not always equal. For the purpose of determining phase angles, a value of zero can be assigned to DELTA2 when it is equal to a minimum value. When determining the minimum for output DELTA2 as a function of the phase bias introduced by phase shifter 26, 30 or 34, multiple minimums may occur due unequal phaser amplitudes, noise and impedance mismatching within the system. This problem can be addressed by recording the value of output DELTA2 for all the possible phase shifter settings of the phase shifter of interest. The proper minimum can be obtained by performing a first order Fourier regression, that is a sinusoidal curve fit to determine the proper voltage minimum.

The above-described procedure should be executed at power-up and should be repeated every two minutes during normal operation. By performing this procedure, at power-up and at frequent intervals during normal operation, phase compensation is provided for the initial phase errors and any additional phase errors that occur over time.

Figure 2:
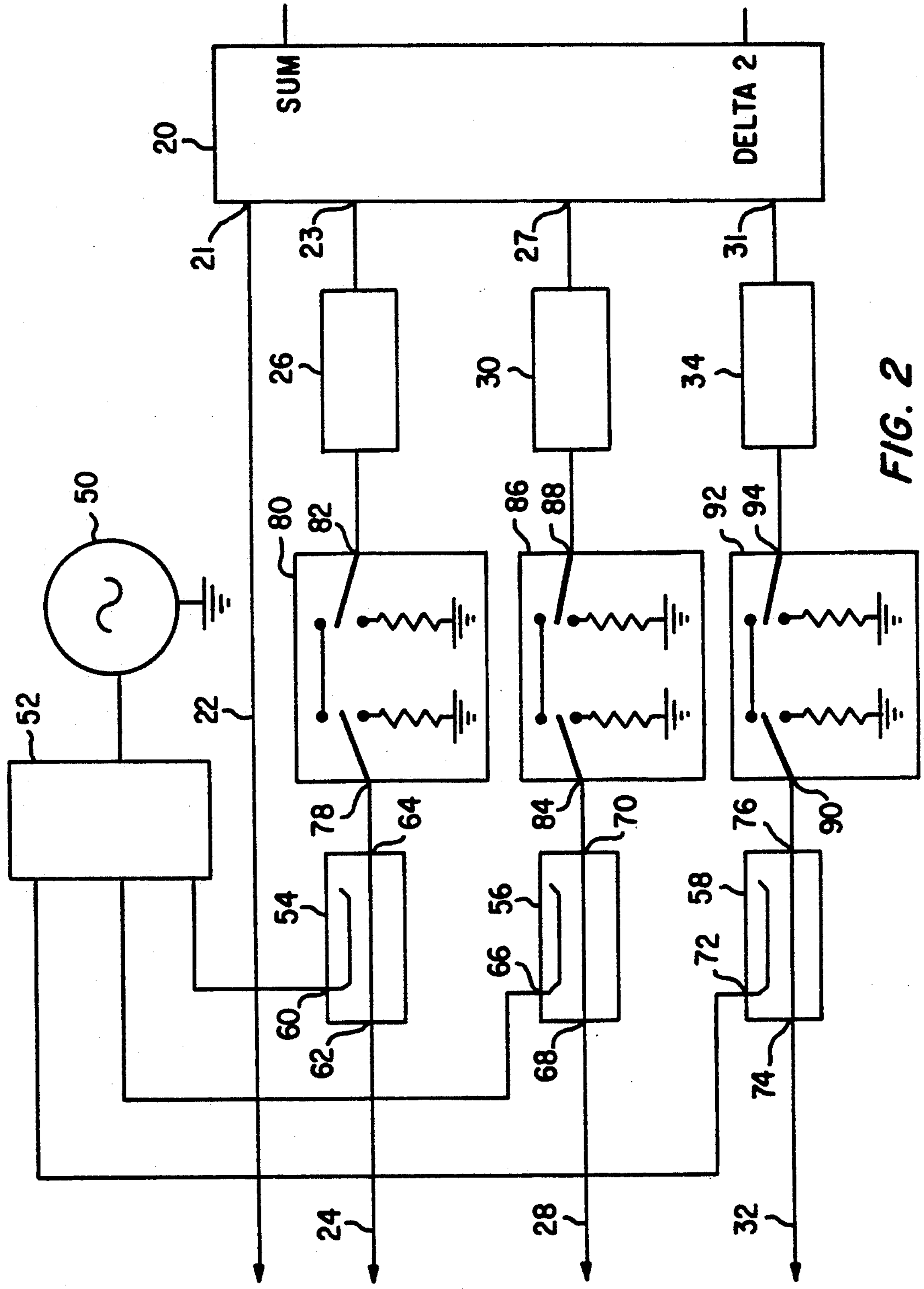
FIG. 2 is a block diagram illustrating the methodology for controlling signal flow within the present invention.

FIG. 2 is a block diagram illustrating how signal flow is controlled in the present invention. Oscillator 50 is used to create a test signal. The output from oscillator 50 is fed to 3:1 RF multiplexor 52. Multiplexor 52 is used to provide the signal from oscillator 50 to one of three directional couplers. Directional coupler 54 couples the test signal from oscillator 50 to electrical path or conductor 24, directional coupler 56 couples the test signal from oscillator 50 to electrical path or conductor 28 and directional coupler 58 couples the signal from oscillator 50 to electrical path or conductor 32.

Each of the directional couplers comprise three ports. Directional coupler 54 comprises ports 60, 62 and 64. Port 60 receives the test signal. The test signal is passed from port 60 and out through port 62 with minimal signal level being passed out port 64. When an input is received by port 62, it is passed out through port 64.

Directional coupler 56 comprises ports 66, 68 and 70. Port 66 receives the test signal. The test signal is passed from port 66 and out through port 68 with minimal signal level being passed out port 70. When an input is received by port 68, it is passed out through port 70.

Directional coupler 58 comprises ports 72, 74 and 76. Port 72 receives the test signal. The test signal is passed from port 72 and out through port 74 with minimal signal level being passed out port 76. When an input is received by port 74, it is passed out through port 76.

Port 64 of directional coupler 54 is connected to terminal 78 of RF switch 80. RF switch 80 comprises 2 single pole double throw switches and two 50 ohm loads or terminations. Terminal 82 of RF switch 80 is connected to the input of phase shifter 26. The output of phase shifter 26 is connected to input 23 of signal combiner 20.

Port 70 of directional coupler 56 is connected to terminal 84 of RF switch 86. RF switch 86 is the same type of switch as RF switch 80. Terminal 88 of RF switch 86 is connected to the input of phase shifter 30. The output of phase shifter 30 is connected to input 27 of signal combiner 20.

Port 76 of directional coupler 58 is connected to terminal 90 of RF switch 92. RF switch 92 is the same type of switch as RF switch 86. Terminal 94 of RF switch 92 is connected to the input of phase shifter 34. The output of phase shifter 34 is connected to input 31 of signal combiner 20.

When a particular antenna element is used for transmitting the test signal from oscillator 50, RF multiplexor 52 is positioned so that it will pass the test signal to the directional coupler of interest. The directional coupler then outputs the test signal to the conductor which is connected to the element that will be used for transmitting. For example, a test signal received on port 60 of directional coupler 54 will be passed out through port 62 and then to antenna element B.

When a directional coupler receives the test signal from multiplexer 52, a small portion of the test signal energy passes through the port which is connected to the RF switch. In the case of directional coupler 54, some test signal energy passes through port 64 to terminal 78 of RF switch 80. In order to prevent this test signal energy from reaching signal combiner 20, the RF switch that is positioned between the directional coupler and phase shifter is set so that the test signal energy is dissipated in a load which is preferably 50 ohms. At the same time, the switch also terminates the input to the phase shifter in another load which is preferably 50 ohms.

When a particular antenna element is used to receive a transmitted signal, the signal is passed through the directional coupler associated with that element unchanged. The output of the directional coupler is then passed through the RF switch and into the associated phase shifter. When receiving a signal, the RF switch that is associated with the receiving antenna element is positioned so that a signal appearing on an input terminal is passed to the output terminal without being terminated in one of the loads.

When a particular antenna element is to be terminated, the RF switch that is associated with that element is positioned so that the switch's input terminal is connected to a load impedance which is preferably 50 ohms. While the switch's input terminal is connected to the load impedance, its output terminal is connected to another load impedance which is preferably 50 ohms.

The RF switches can be constructed using two single pole double throw switches and two 50 ohm loads. The single pole double throw switches can be obtained from M/ACOM which is located at 21 Continental Blvd., Merrimack, N.H. 03054 (603-424-4111). Multiplexor 52 can be constructed using a single pole triple throw RF switch. The directional couplers can also be obtained from M/ACOM. The phase shifters can be digital diode phase shifters obtained from Triangle Microwave Inc., which is located at 31 Fatinella Drive, East Hanover, N.J. 07936. It is preferable to use six bit phase shifters.

Figure 3:
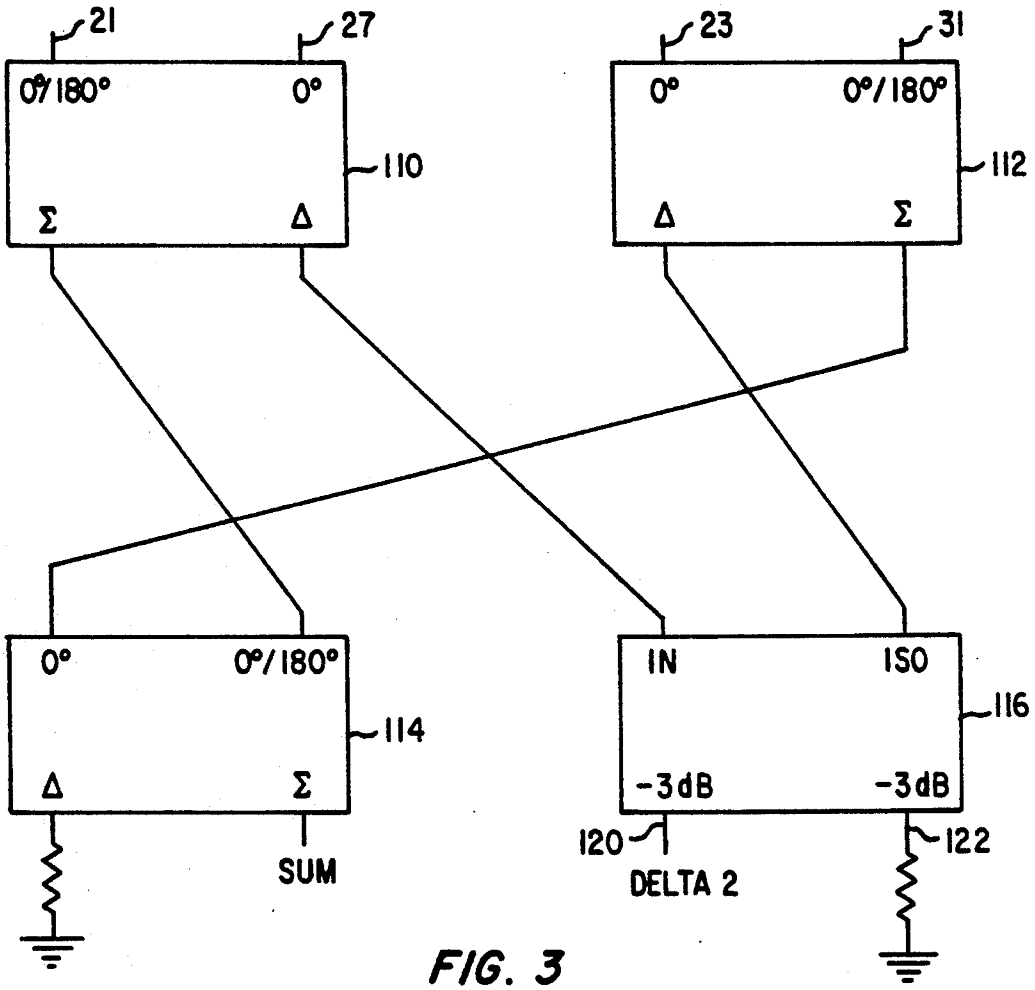
FIG. 3 is a block diagram of a signal combiner.

FIG. 3 is a block diagram of signal combiner 20. Signal combiner 20 can be constructed using 3 db/180° crossover hybrid couplers and 3 db/90° crossover hybrid couplers. Hybrid couplers 110, 112 and 114 are 3 db/180° hybrid coupler which are preferably 2031-6331-00 Omni Spectra hybrid couplers which can be obtained from M/ACOM. Hybrid coupler 116 is a 3 db/90° crossover hybrid coupler which is preferably an Omni Spectra 2032-6344-00 hybrid coupler which can also be obtained from M/ACOM. Inputs 21 and 27 of signal combiner 20 correspond to the 0°/180° input and the 0° input of hybrid combiner 110 respectively. Inputs 23 and 31 of signal combiner 20 correspond to the 0° input and the 0°/180° input of hybrid combiner 112 respectively. The outputs of hybrid combiners 110 and 112 are connected to the inputs of hybrid combiners 114 and 116 using semi-rigid coaxial cables. Other types of RF conductors can be used. The Σ output of hybrid combiner 110 is connected to the 0°/180° input of hybrid combiner 114. The signal received by the 0°/180° input of hybrid combiner 114 corresponds to the sum of input 21 and input 27. The Δ output of hybrid combiner 110 is connected to the "IN" input of hybrid combiner 116. The signal received by the "IN" input of hybrid combiner 116 corresponds to input 21 minus input 27. The Δ output of hybrid combiner 112 is received by the "ISO" input of hybrid combiner 116. The input received by the "ISO" input of hybrid combiner 116 corresponds to input 23 minus input 31. The Σ output of hybrid combiner 112 is received by the 0° input of hybrid combiner 114. The signal received at the 0° input of hybrid combiner 114 corresponds to the summation of inputs 23 and 31. The Σ output of hybrid combiner 114 corresponds to the SUM output of signal combiner 20. The Δ output of hybrid combiner 114 is terminated in a 50 ohm load. Output 120 of hybrid combiner 116 corresponds to the DELTA2 output of signal combiner 20. Output 122 of hybrid combiner 116 is terminated in a 50 ohm load.

The conductors interconnecting the hybrid combiners are trimmed such that the SUM output is represented by the equation $$SUM=A\#+B\#+C\#+D\#$$

and the DELTA2 output is represented by the equation $$DELTA2=(A\#-C\#)+j(B\#-D\#)+\theta$$

where $\theta$ is an arbitrary phase offset with respect to the SUM output.

It is also possible to construct signal combiner 20 using a single hybrid package rather than the four separate hybrid packages.

Figure 4:
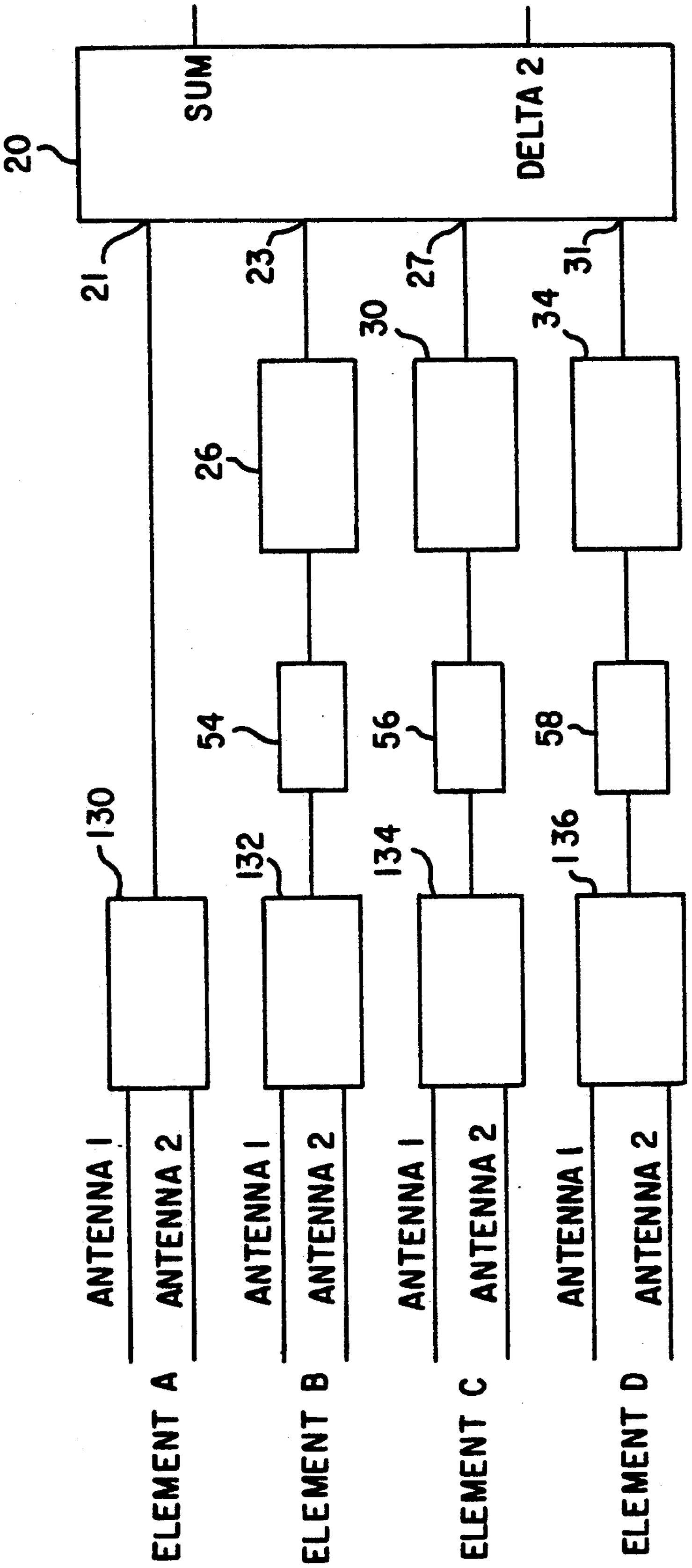
FIG. 4 is a block diagram of a two-antenna system in which each antenna has multiple elements.

FIG. 4 is a block diagram illustrating the present invention being used with two multi-element antennas. The arrangement is similar to the arrangement described with respect to FIG. 2, however, switches 130, 132, 134 and 136 have been added to switch between the different antennas. The switches comprise a single pole double throw RF switch. When placed in a first position, the elements of a first antenna are connected to the circuitry of FIG. 2. When placed in a second position, the elements of the second antenna are connected to the circuitry of FIG. 2. By using the aforementioned switches, compensation can be provided for the phase errors resulting from the differing electrical path lengths associated with the elements of each antenna. When in the first position, the proper phase shift biases are determined for the first antenna and are used whenever antenna 1 is selected. When in the second position, the phase shift biases for antenna 2 are determined and used whenever antenna 2 is selected. This arrangement saves circuitry by allowing two antennas to be used with only one set of compensation hardware. This type of arrangement can be used for any number of antennas as long as the antennas are time division multiplexed.

We claim:

1. An apparatus for correcting electrical path phase errors in an electromagnetic receiving system comprising an antenna having a first element being connected to a first electrical path, a second element being connected to a second electrical path, a third element being connected to a third electrical path and a fourth element being connected to a fourth electrical path, said first, said second, said third and said fourth elements being arranged in an approximately square pattern, said apparatus comprising:

(a) selective transmitting means for transmitting a test signal on a selected element so that said test signal is received by another element, said selected element being one of said second, third and fourth elements;

(b) first phase shifting means for providing a first variable phase shift to a signal carried on the second electrical path to produce a first phase shifted signal;

(c) second phase shifting means for providing a second variable phase shift to a signal carried on the third electrical path to produce a second phase shifted signal;

(d) third phase shifting means for providing a third variable phase shift to a signal carried on the fourth electric path to produce a third phase shifted signal; and (e) signal combining means for combining a signal carried on the first electrical path, said first phase shifted signal, said second phase shifted signal and said third phase shifted signal so that an electrical path phase correction value can be determined, whereby said signal combining means produces an output represented by $(A^{\#}-C^{\#})+j(B^{\#}-D^{\#})$, where j represents a phase shift of 90° and where $A^{\#}$ represents a first signal on a first input of said signal combining means, $B^{\#}$ represents a second signal on a second input of said signal combining means, $C^{\#}$ represents a third signal on a third input of said signal combining means and $D^{\#}$ represents a fourth signal on a fourth input of said signal combining means.

2. The apparatus of claim 1, wherein said selective transmitting means comprises a directional coupler being electrically connected to said selected element.

3. The apparatus of claim 2, wherein said selective transmitting means comprises a multiplexer being electrically connected to said directional coupler.

4. The apparatus of claim 1, further comprising a switching means for selectively maintaining and breaking an electrical path between an element and an input of said signal combining means.

5. The apparatus of claim 4, wherein said switching means comprises a terminating impedance.

6. A method for correcting electrical path phase errors in an electromagnetic receiving system comprising an antenna having a first element being connected to a first electrical path, a second element being connected to a second electrical path, a third element being connected to a third electrical path and a fourth element being connected to a fourth electrical path, said first, said second, said third and said fourth elements being arranged in an approximately square pattern, said method comprising the steps of:

(a) transmitting a first signal using the second element;

(b) receiving said first signal on the first element to produce a first received signal and receiving said first signal on the third element to produce a second received signal;

(c) determining a third electrical path phase correction value by adjusting a phase shift provided to said second received signal so that a phase of said second received signal is approximately equal to a phase of said first received signal;

(d) transmitting a second signal using the second element;

(e) receiving said second signal on the first element to produce a third received signal and receiving said second signal on the fourth element to produce a fourth received signal;

(f) determining a first phase value by adjusting a phase shift provided to said fourth received signal so that a phase of said fourth received signal is approximately equal to a phase of said third received signal minus 90 degrees;

(g) transmitting a third signal using the third element;

(h) receiving said third signal on the first element to produce a fifth received signal and receiving said third signal on the fourth element to produce a sixth received signal;

(i) determining a second phase value by adjusting a phase shift provided to said sixth received signal so that a phase of said sixth received signal is approximately equal to a phase of said fifth received signal minus 90 degrees; and (j) determining a fourth electrical path phase correction value by adding 90 degrees to an average of said first and second phase values.

7. The method of claim 6, further comprising the steps of:

transmitting a fourth signal using the third element;

receiving said fourth signal on the first element to produce a seventh received signal and receiving said fourth signal on the second element to produce an eighth received signal;

determining a third phase value by adjusting a phase shift provided to said eighth received signal so that a phase of said eighth received signal is approximately equal to a phase of said seventh received signal plus 90 degrees;

transmitting a fifth signal using the fourth element;

receiving said fifth signal on the first element to produce a ninth received signal and receiving said fifth signal on the second element to produce a tenth received signal;

determining a fourth phase value by adjusting a phase shift provided to said tenth received signal so that a phase of said tenth received signal is approximately equal to a phase of said ninth received signal plus 90 degrees; and determining a second electrical path phase correction value by substracting 90 degrees from an average of said third and said fourth phase values.

* * * * *